United States Patent
Song (10) Patent No.: US 10,820,118 B2
(45) Date of Patent: Oct. 27, 2020

(54) SMART HEARING DEVICE WHICH USES EXTERNAL PROCESSOR IN ORDER TO REDUCE COST OF HEARING AID

(71) Applicant: Olive Union, Inc., Seoul (KR)

(72) Inventor: Myung Geun Song, Seoul (KR)

(73) Assignee: OLIVE UNION, INC., Seoul (KR)

( * ) Notice: Subject to any disclaimer, the term of this patent is extended or adjusted under 35 U.S.C. 154(b) by 0 days.

(21) Appl. No.: 16/339,677

(22) PCT Filed: Jan. 12, 2018

(86) PCT No.: PCT/KR2018/000584
§ 371 (c)(1),
(2) Date: Apr. 4, 2019

(87) PCT Pub. No.: WO2018/131916
PCT Pub. Date: Jul. 19, 2018

(65) Prior Publication Data
US 2020/0053485 A1 Feb. 13, 2020

(30) Foreign Application Priority Data
Jan. 12, 2017 (KR) .................. 10-2017-0005109

(51) Int. Cl.
*H04R 25/00* (2006.01)
*H04W 4/80* (2018.01)

(52) U.S. Cl.
CPC .......... *H04R 25/30* (2013.01); *H04R 25/502* (2013.01); *H04R 25/554* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 2005/0192515 A1* | 9/2005 | Givens | A61B 5/121 600/559 |
| 2010/0145411 A1* | 6/2010 | Spitzer | H04R 25/70 607/57 |
| 2014/0211972 A1 | 7/2014 | Kim et al. | |

(Continued)

FOREIGN PATENT DOCUMENTS

| KR | 10-2011-0007355 A | 1/2011 |
|---|---|---|
| KR | 10-1254660 B1 | 4/2013 |

(Continued)

OTHER PUBLICATIONS

NAP, "Hearing Loss: Determining Eligibility for Social Security Benefits (2005) Chapter: Appendix B: American National Standards on Acoustics." pp. 1-5. 2005. https://www.nap.edu/read/11099/chapter/12.*

(Continued)

*Primary Examiner* — Qin Zhu
(74) *Attorney, Agent, or Firm* — Hauptman Ham, LLP (57) ABSTRACT

A smart hearing method in which an external processor is used in order to reduce the cost of a hearing aid, according to an embodiment of the present invention, comprises the steps of: determining an operation mode of a hearing aid; and when it is determined that the operation mode of the hearing aid corresponds to a test mode among a normal mode and the test mode, transmitting a received audio signal to a terminal other than the hearing aid.

12 Claims, 10 Drawing Sheets

(56) References Cited

U.S. PATENT DOCUMENTS

2017/0230769 A1\* 8/2017 Nguyen ................ H04R 25/305
2017/0257712 A1\* 9/2017 Porsbo ................... H04R 25/30

FOREIGN PATENT DOCUMENTS

| KR | 10-2014-0011605 A | 1/2014 |
| KR | 10-2014-0098615 A | 8/2014 |
| KR | 10-2015-0051542 A | 5/2015 |

OTHER PUBLICATIONS

International Search Report for corresponding international application PCT/KR2018/000584 dated May 1, 2018.

\* cited by examiner

SMART HEARING DEVICE WHICH USES EXTERNAL PROCESSOR IN ORDER TO REDUCE COST OF HEARING AID

CROSS REFERENCE TO RELATED APPLICATION

This present application is a national stage filing under 35 U.S.C § 371 of PCT application number PCT/KR2018/000584 filed on Jan. 12, 2018 which is based upon and claims the benefit of priority to Korean Patent Application No, 10-2017-0005109 filed on Jan. 12, 2017 in the Korean Intellectual Property Office. The disclosures of the above-listed applications are hereby incorporated by reference herein in their entirety.

TECHNICAL FIELD

The present invention relates to a smart hearing device which uses an external processor in order to reduce cost of a hearing aid, more particularly, a smart hearing device which uses an external processor in order to reduce cost of a hearing aid including transmitting a received audio signal to a terminal other than the hearing aid when it is determined that an operation mode of the hearing aid is a test mode among a normal mode or the test mode.

BACKGROUND ART

Recently, patients who had not been helped previously by wearing a hearing aid may improve their hearing when they select and wear a suitable hearing aid by saltatory development of medical engineering technology.

A hearing aid is a high-tech device that is always attached to the body among medical devices. The hearing aid should keep receiving control according to hearing change and consistently have after service because of parts damaged by humidity and foreign matter in an ear. Therefore, the hearing aid is considered as one of the most important technologies among medical engineering technologies.

The hearing aid was in a form of horn type sound collector in the past, but now a form of electric hearing aid usually helping to amplify sound is used. Also, the hearing aid has a bone-conducting type attached to the mastoid part, but has an air conduction type in many cases. In other words, the hearing aid converts sound wave received by a microphone to electric vibration, magnifies it, and turns it into sound wave by an earphone to make it heard in an ear.

Recently, researches on the hearing aid have been continuously carried out, and a lately developed digital hearing aid divides a low frequency band and a high frequency band among an audible frequency band into several channels and amplifies or controls individually instead of simply amplifying only sound. The channels are referred to as 2 channel, 4 channel, and 9 channel depending on the number of the channels. The digital amplifier may hear much clear sound than a conventional amplifier because the digital amplifier adjusts amplification as much as needed according to the degree of hearing loss of a user.

Recently, a hearing aid company has been making efforts such as developing a powerful hearing aid processor. The hearing aid processor is equipped with advanced processing speed and memory twice as fast as a conventional processor, and all chips and components are extremely small because of advanced nanotechnology.

In spite of the advanced technology for the hearing aid, a processor placed inside the hearing aid is priced at more than one million won each, so it makes a burden for consumers to use on a daily basis.

Some developers try to solve the price problem with effect according to mass-production, but this solution has a limit. This is because hearing aids are less demanding than general medical devices.

Also, there are a lot of fixed costs such as renting a store, hiring a professional, buying high-tech equipment, and the like in supplying, selling, and servicing hearing aids. The price issue of the hearing aid is still an important issue which is consistently searched by developers.

Technical Problem

According to an aspect of an example embodiment of the present invention, a smart hearing device using an external processor to reduce cost of a hearing aid reduces cost of the hearing aid by using a processor of an external terminal of hearing aid.

According to an aspect of an example embodiment of the present invention, a smart hearing device using an external processor to reduce cost of a hearing aid selectively uses a test processed by a processor of an external processor of hearing aid on only test mode and improves efficiency of the device.

According to an aspect of an example embodiment of the present invention, a smart hearing device using an external processor to reduce cost of a hearing aid effectively controls the device by detecting hearing of a user according to frequency.

According to an aspect of an example embodiment of the present invention, a smart hearing device using an external processor to reduce cost of a hearing aid connects an external processor and the hearing aid by using near field communication and makes a user conveniently use the technology.

Technical Solution

A smart hearing method which uses an external processor in order to reduce cost of a hearing aid includes determining an operation mode of a hearing aid.

The smart hearing method which uses an external processor in order to reduce cost of a hearing aid includes transmitting a received audio signal to a terminal other than the hearing aid when it is determined that the operation mode of the hearing aid is a test mode among a normal mode or the test mode.

Also, the smart hearing method which uses an external processor in order to reduce cost of a hearing aid includes receiving information related to test result from the different terminal in response to processing the audio signal by the different terminal.

Also, the smart hearing method which uses an external processor in order to reduce cost of a hearing aid includes setting a control parameter for the hearing aid based on the information related to the test result.

The setting a control parameter for the hearing aid based on the information related to the test result includes using a control value for each gain by frequency for the audio signal as the control parameter and using a filter value for each gain by frequency for the audio signal as the control parameter.

The receiving information related to test result from the different terminal in response to processing the audio signal by the different terminal includes activating near field communication module of the hearing aid in response to processing the audio signal, pairing the hearing aid and the different terminal by using the near field communication module, testing with test equipment located in the terminal, and the testing comprises receiving the audio signal and measuring gain by frequency of the audio signal.

The testing with test equipment located in the terminal includes quantifying hearing of a user according to the test result and referring to and using the quantified hearing in next test.

The testing with test equipment located in the terminal includes determining age group of a user according to the test result and referring to and using the determined age group in next test.

The testing with test equipment located in the terminal includes performing the test if ambient noise is below a specific value and setting the specific value below 10 dB.

The testing with test equipment located in the terminal includes practice testing before the actual test and confirming whether the practice test satisfies various external conditions for the test.

Also, the testing with test equipment located in the terminal includes storing monthly record for the test and selectively applying and using the stored monthly record.

A smart hearing method which uses an external processor in order to reduce cost of a hearing aid includes processing an analog signal for audio heard from outside into a digital signal, adjusting each balance of the processed signal by using the control parameter when gain for specific frequency is relatively weak and when gain for specific frequency is relatively strong, and converting the digital signal for the adjusted signal to analog signal and transmitting the analog signal to a user.

A smart hearing device which uses an external processor in order to reduce cost of a hearing aid includes a determining unit for determining an operation mode of a hearing aid.

Also, the smart hearing device which uses an external processor in order to reduce cost of a hearing aid includes a transmitting unit for transmitting a received audio signal to a terminal other than the hearing aid when it is determined that the operation mode of the hearing aid is a test mode among a normal mode or the est mode.

Also, the smart hearing device which uses an external processor in order to reduce cost of a hearing aid includes a receiving unit for receiving information related to test result from the different terminal in response to processing the audio signal by the different terminal, and includes a setting unit for setting a control parameter for the hearing aid based on the information related to the test result.

The setting unit for setting a control parameter for the hearing aid based on the information related to the test result includes a control value using unit for using a control value for each gain by frequency for the audio signal as the control parameter and a filter value using unit for using a filter value for each gain for frequency for the audio signal as the control parameter.

The receiving unit for receiving information related to test result from the different terminal in response to processing the audio signal by the different terminal includes an activating unit for activating near field communication module of hearing aid in response to processing the audio signal, a pairing unit for pairing the hearing aid and the different terminal by using the near field communication module, a testing unit for testing with test equipment located in the terminal, and a measuring unit for receiving the audio signal and measuring gain by frequency for the audio signal.

The testing unit for testing with test equipment located in the terminal includes a quantifying unit for quantifying hearing of a user according to the test result and a using unit for referring to and using the quantified hearing in next test.

Also, the testing unit for testing with test equipment located in the terminal includes a determining unit for determining age group of a user according to the test result and an age group using unit for referring to and using the determined age group in next test.

Also, the testing unit for testing with test equipment located in the terminal includes a performing unit for performing the test when ambient noise is below a specific value and a specific value setting unit for setting the specific value below 10 dB.

Also, the testing unit for testing with test equipment located in the terminal includes a practice testing unit for practice testing before the real test and a confirming unit for confirming whether the practice test satisfies various external conditions for the test.

Also, the testing unit for testing with test equipment located in the terminal includes a storing unit for storing monthly record for the test and a monthly record using unit for selectively applying and using the stored monthly record.

A smart hearing device which uses an external processor in order to reduce cost of a hearing aid includes a processing unit for processing an analog signal for audio heard from outside into a digital signal, an adjusting unit for adjusting each balance of the processed signal by using the control parameter when gain for specific frequency is relatively weak and when gain for specific frequency is relatively strong, and a signal transmitting unit for converting the digital signal for the adjusted signal to analog signal and transmitting the analog signal to a user.

Advantageous Effects of the Invention

According to embodiments of the present invention, a smart hearing device which uses an external processor in order to reduce cost of a hearing aid may reduce cost of the hearing aid by using a processor of an external terminal.

According to embodiments of the present invention, a smart hearing device which uses an external processor in order to reduce cost of a hearing aid may improve efficiency of the device by selectively using test processed by a processor of an external terminal of hearing aid on only test mode.

According to embodiments of the present invention, a smart hearing device which uses an external processor in order to reduce cost of a hearing aid may control effectively device by detecting hearing of a user according to frequency.

According to embodiments of the present invention, a smart hearing device which uses an external processor in order to reduce cost of a hearing aid may connect an external processor and the hearing aid by using near field communication and make a user conveniently use the technology.

BEST MODE FOR CARRYING OUT THE INVENTION

Hereinafter, embodiments of the present invention will be described in detail with reference to the accompanying drawings. Although limited embodiments are described hereinafter, the embodiments are examples of the present invention, and those skilled in the art may easily modify the embodiments.

Figure 1:
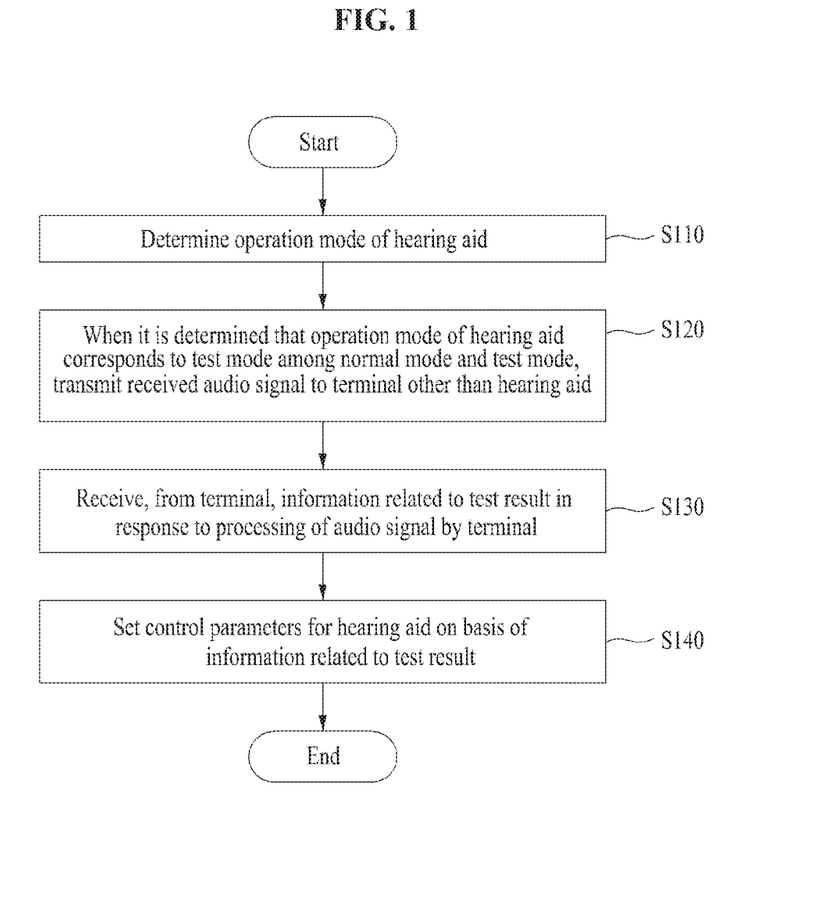
FIG. 1 is a flow chart of a smart hearing method which uses an external processor in order to reduce cost of a hearing aid, according to an embodiment of the present invention.

FIG. 1 is a flow chart of a smart hearing method which uses an external processor in order to reduce cost of a hearing aid, according to an embodiment of the present invention.

Referring to FIG. 1, a smart hearing method which uses an external processor in order to reduce cost of a hearing aid according to an example of embodiments determines an operation mode S110. The mode of the hearing aid may be a normal more or a test mode.

Also, the smart hearing method which uses an external processor in order to reduce cost of a hearing aid according to an example of embodiments transmits a received audio signal to a terminal other than the hearing aid when it is determined that the operation mode of the hearing aid is the test mode among the normal mode or the test mode S120.

A user or developer should create an environment for transmitting the audio signal, and the environment may improve efficiency of the smart hearing method which uses an external processor in order to reduce cost of a hearing aid.

Also, the smart hearing method which uses an external processor in order to reduce cost of a hearing aid according to an example of embodiments receives information related to test result from the different terminal in response to processing the audio signal by the different terminal S130.

Figure 3:
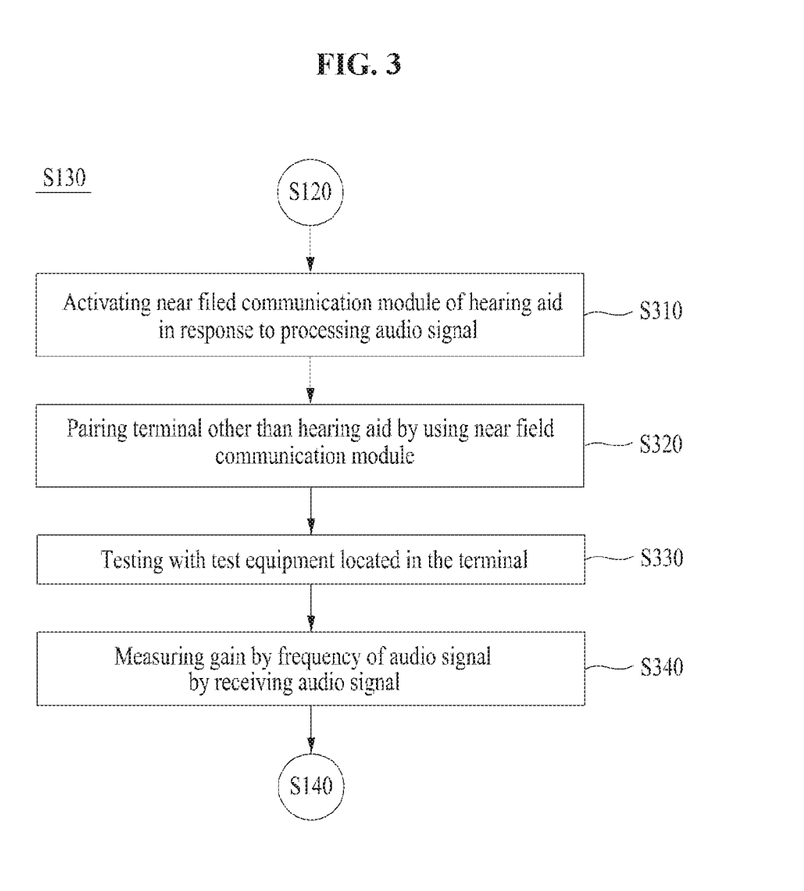
FIG. 3 is a flow chart of receiving information related test result from the different terminal in response to processing an audio signal by the different terminal, according to an embodiment of the present invention.

A detailed description related to the receiving process would be described in FIG. 3.

A user and developer should create an optimized environment for the receiving similar to the process for transmitting the audio signal to process the receiving, and the environment may improve efficiency of the smart hearing method which uses an external processor in order to reduce cost of a hearing aid.

Also, the smart hearing method which uses an external processor in order to reduce cost of a hearing aid according to an example of embodiments sets a control parameter for the hearing aid based on information related to test result S140. The control parameter controls the test result processed in the present invention to be suitable for using in the smart hearing method which uses an external processor in order to reduce cost of a hearing aid.

Figure 2:
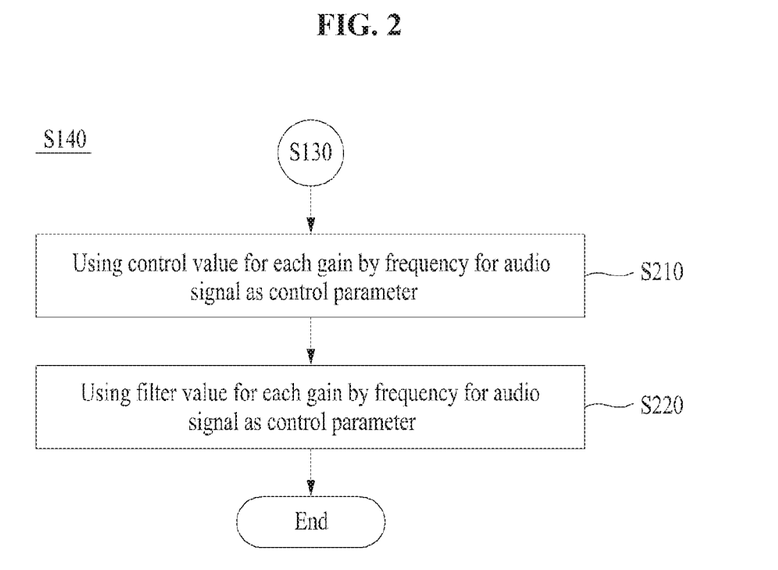
FIG. 2 is a flow chart of setting a control parameter for a hearing aid based on information related to test result, according to an embodiment of the present invention.

A detailed description for the setting the control parameter would be described in FIG. 2.

FIG. 2 is a flow chart of setting a control parameter for a hearing aid based on information related to test result, according to an embodiment of the present invention.

Referring to FIG. 2, setting a control parameter for a hearing aid based on information related to test result according to an example of embodiments uses a control value for each gain by frequency for an audio signal as the control parameter S210.

It is because the gain by frequency that the audio signal that each user has have is different, and a smart hearing device which uses an external processor in order to reduce cost of a hearing aid should control the each value.

The gain may show intensity of each measuring value.

Also, the setting a control parameter for a hearing aid based on information related to test result according to an example of embodiments uses a filter value for each gain by frequency for an audio signal as the control parameter S220.

The using a filter value for each gain may improve accuracy of the hearing aid by filtering the controlled value once more with a filter by using the control value for gain.

FIG. 3 is a flow chart of receiving information related test result from the different terminal in response to processing an audio signal by the different terminal, according to an embodiment of the present invention.

Referring to FIG. 3, receiving information related to test result from the different terminal in response to processing an audio signal by the different terminal includes activating near field communication module of the hearing aid in response to processing the audio signal S310.

The activating near field communication module of the hearing aid may be activating connection of the plurality of devices by using Bluetooth or another technology.

Also, the receiving information related to test result from the different terminal in response to processing audio signal by the different terminal includes pairing the hearing aid and the different terminal by using the near field communication module S320.

The pairing may reduce possibility that a terminal connected with the hearing aid may be confused with a different terminal other than the terminal connected with the hearing aid. This may improve efficiency of a smart hearing method which uses an external processor in order to reduce cost of a hearing aid.

Also, the receiving information related to test result from the different terminal in response to processing an audio signal by the different terminal according to an example of embodiments includes testing with test equipment located in the terminal S330.

The testing may be processed differently for each audio signal, and may be processed through various processes. A detailed description for the testing with test equipment located in the terminal would be described in FIG. 4.

Also, the testing may include measuring gain by frequency of an audio signal by receiving the audio signal S340.

Hearing loss of a user is mainly limited to a specific frequency, not to whole range of frequency. Also, the gain by frequency may be different for each user, and the hearing aid may control gain of frequency band in which a user is weak.

Figure 4:
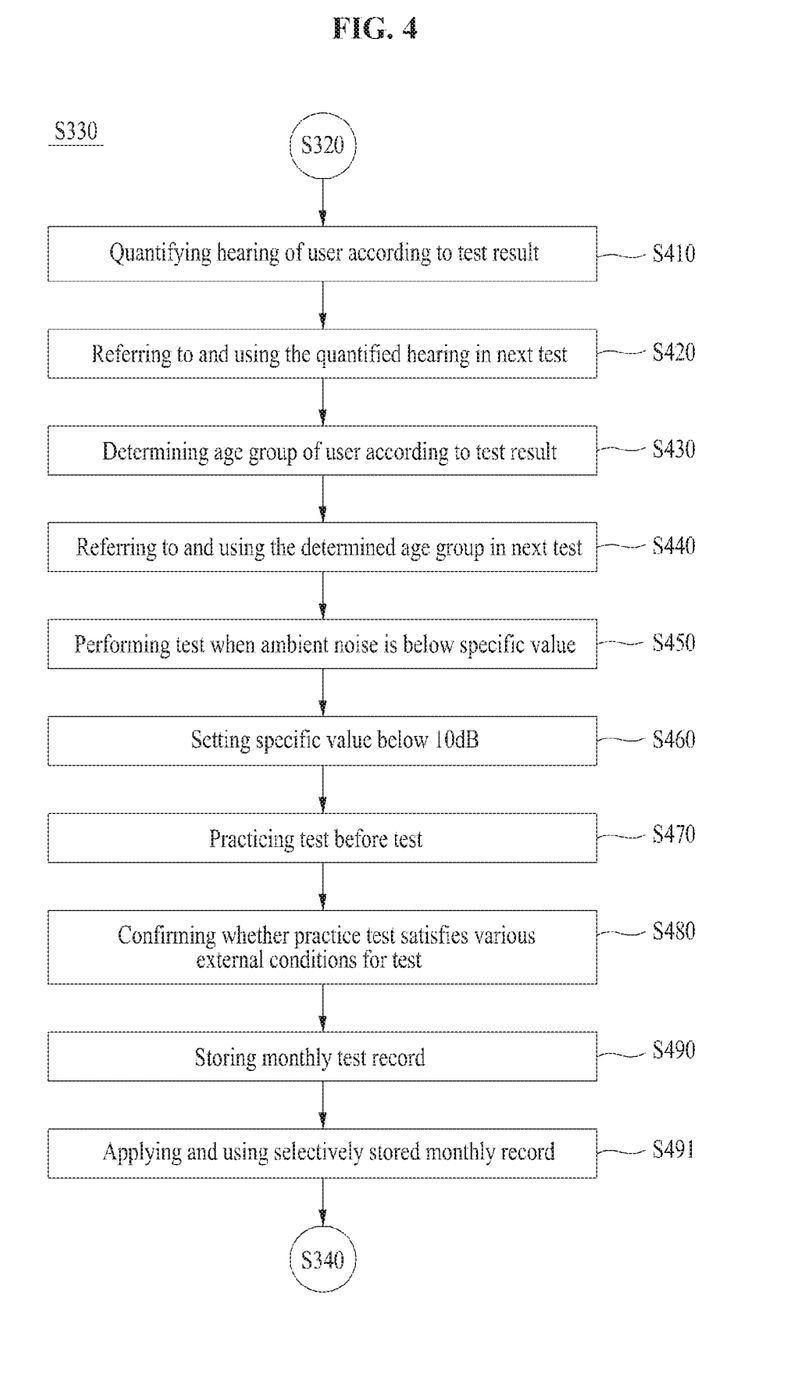
FIG. 4 is a flow chart of testing with test equipment located in the terminal, according to an embodiment of the present invention.

FIG. 4 is a flow chart of testing with test equipment located in the terminal, according to an embodiment of the present invention.

Referring to FIG. 4, the testing with test equipment includes quantifying hearing of a user according to the test result S410.

The quantifying hearing of a user enables the process using the hearing aid to operate more easily.

The testing with test equipment refers to and uses the quantified hearing in the next test S420. This may increase accuracy for a plurality of tests when the plurality of tests is performed.

Also, the testing with test equipment determines age group of a user according to the test result S430. The determined age group is referred to and used in the next test S430.

Also, the testing with test equipment may be performed if ambient noise is below a specific value S450.

Also, the testing with test equipment may set the specific value below 10 dB S460. The reducing ambient noise may increase accuracy for result value extracted by performing the test.

Also, the testing with test equipment may perform a practice test before the actual test S470. The practicing test may be a process for confirming whether the practice test satisfies a series of conditions for the test S480.

Also, the testing with test equipment may store monthly record for the test S490. Also, the testing with test equipment selectively applies and uses the stored monthly record S491.

Figure 5:
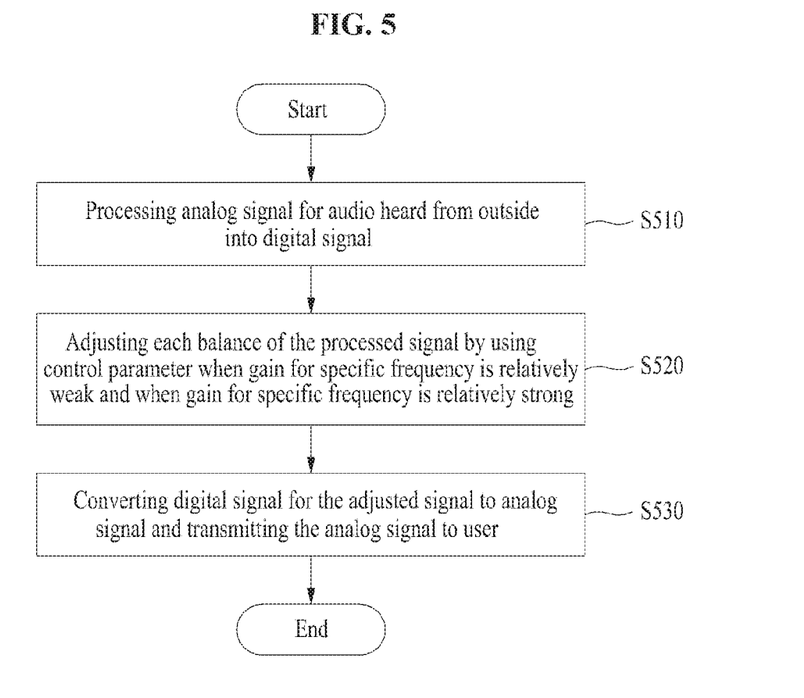
FIG. 5 is a flow chart of processing an analog signal for audio heard from outside into a digital signal, according to an embodiment of the present invention.

FIG. 5 is a flow chart of processing an analog signal for audio heard from outside into a digital signal, according to an embodiment of the present invention.

Referring to FIG. 5, a smart hearing method which uses an external processor in order to reduce cost of a hearing aid according to an example of embodiments includes processing an analog signal for audio heard from outside into a digital signal S510.

Also, the smart hearing method which uses an external processor in order to reduce cost of a hearing aid may adjust each balance of the processed signal by using the control parameter when gain for specific frequency is relatively weak and when gain for specific frequency is relatively strong S520.

Also, the smart hearing method which uses an external processor in order to reduce cost of a hearing aid includes converting the digital signal for the adjusted signal to analog signal and transmitting the analog signal to a user S530.

Figure 6:
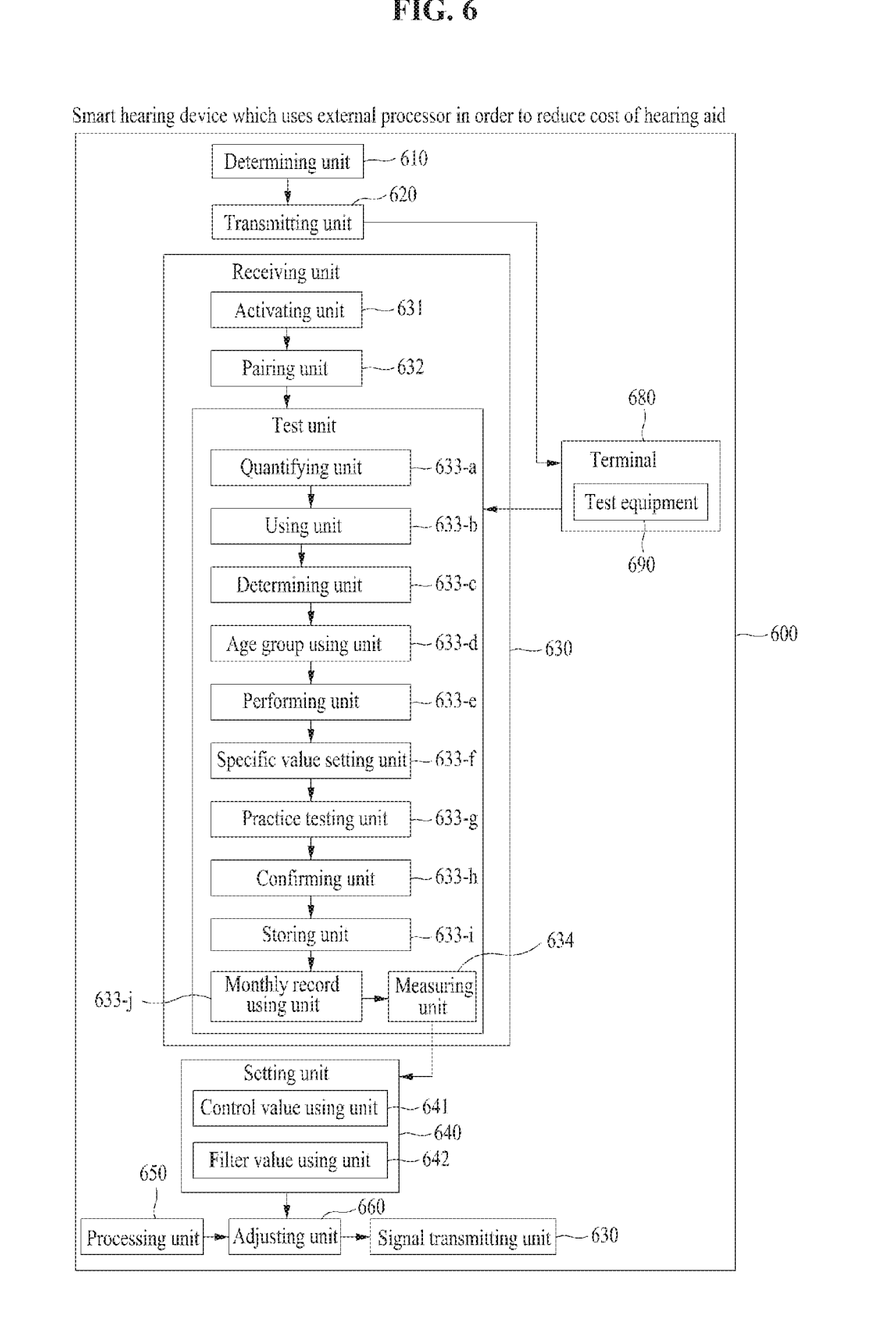
FIG. 6 represents a smart hearing device which uses an external processor in order to reduce cost of hearing aid, according to an embodiment of the present invention.

FIG. 6 represents a smart hearing device which uses an external processor in order to reduce cost of hearing aid, according to an embodiment of the present invention.

Referring to FIG. 6, a smart hearing device 600 which uses an external processor in order to reduce cost of a hearing aid according to an example of embodiments includes a determining unit 610.

The determining unit 610 may determine an operation mode of a hearing aid. The operation mode of the hearing aid may be a normal mode or a test mode.

Also, the smart hearing device 600 which uses an external processor in order to reduce cost of the hearing aid includes a transmitting unit 620 for transmitting an audio signal received to a terminal 680 other than the hearing aid if it is determined that the operation mode of the hearing aid is test mode among the normal mode and the test mode.

Also, the smart hearing device 600 which uses an external processor in order to reduce cost of the hearing aid includes a receiving unit 630. The receiving unit 630 receives information related to test result from the different terminal 680 in response to processing the audio signal by the different terminal 680.

Also, the receiving unit 680 includes an activating unit 631, a paring unit 632, a testing unit 633, and a measuring unit 634.

The activating unit 631 activates near field communication module of the hearing aid in response that the audio signal is processed. Also, the pairing unit 632 pairs the different terminal 680 with the hearing aid by using the near field communication module.

Also, the testing unit 633 includes a quantifying unit 633-*a*, a using unit 633-*b*, a determining unit 633-*c*, an age group using unit 633-*d*, a performing unit 633-*e*, a specific value setting unit 633-*f*, a practice testing unit 633-*g*, a confirming unit 633-*h*, a storing unit 633-*l*, and a monthly record using unit 633-*j*.

The quantifying unit 633-*a* quantifies hearing of a user according to the test result. Also, the using unit 633-*b* refers to and uses the quantified hearing in next test.

Also, the determining unit 633-*c* determines age group of a user according to the test result.

Also, the age group using unit 633-*d* refers to and uses the determined age group in next test.

Also, the performing unit 633-*e* performs the test when ambient noise is below a specific value. Also, the specific value setting unit 633-*f* sets the specific value below 10 dB.

Also, the practice testing unit 633-*a* practices a test before the real test. Also, the confirming unit 633-*h* confirms whether the practice test satisfies various external conditions for the test.

Also, the storing unit 633-*i* stores monthly record for the test.

Also, the monthly record using unit 633-*l* selectively applies and uses the stored monthly record.

Also, the measuring unit 634 included in the receiving unit 60 receives the audio signal and measures gain by frequency of the audio signal.

Also, the smart hearing device 600 which uses an external processor in order to reduce cost of the hearing aid includes a setting unit 640. The setting unit 640 includes a control value using unit 641 and a filter value using unit 642. The setting unit 640 sets a control parameter for the hearing aid based on information related to the test result. Also, the control value using unit 641 uses a control value for each gain by frequency for the audio signal as the control parameter.

Also, the filter value using unit 642 uses a filter value for each gain by frequency for the audio signal as the control parameter.

Also, the smart hearing device 600 which uses an external processor in order to reduce cost of the hearing aid includes a processing unit 650, an adjusting unit 660, and signal transmitting unit 670. The processing unit 650 processes an analog signal for audio heard from outside into a digital signal.

Also, the adjusting unit 660 adjusts each balance of the processed signal by using the control parameter when gain for specific frequency is relatively weak and when gain for specific frequency is relatively strong.

Also, the signal transmitting unit 670 converts the digital signal for the adjusted signal to analog signal and transmits the analog signal to a user.

Figure 7:
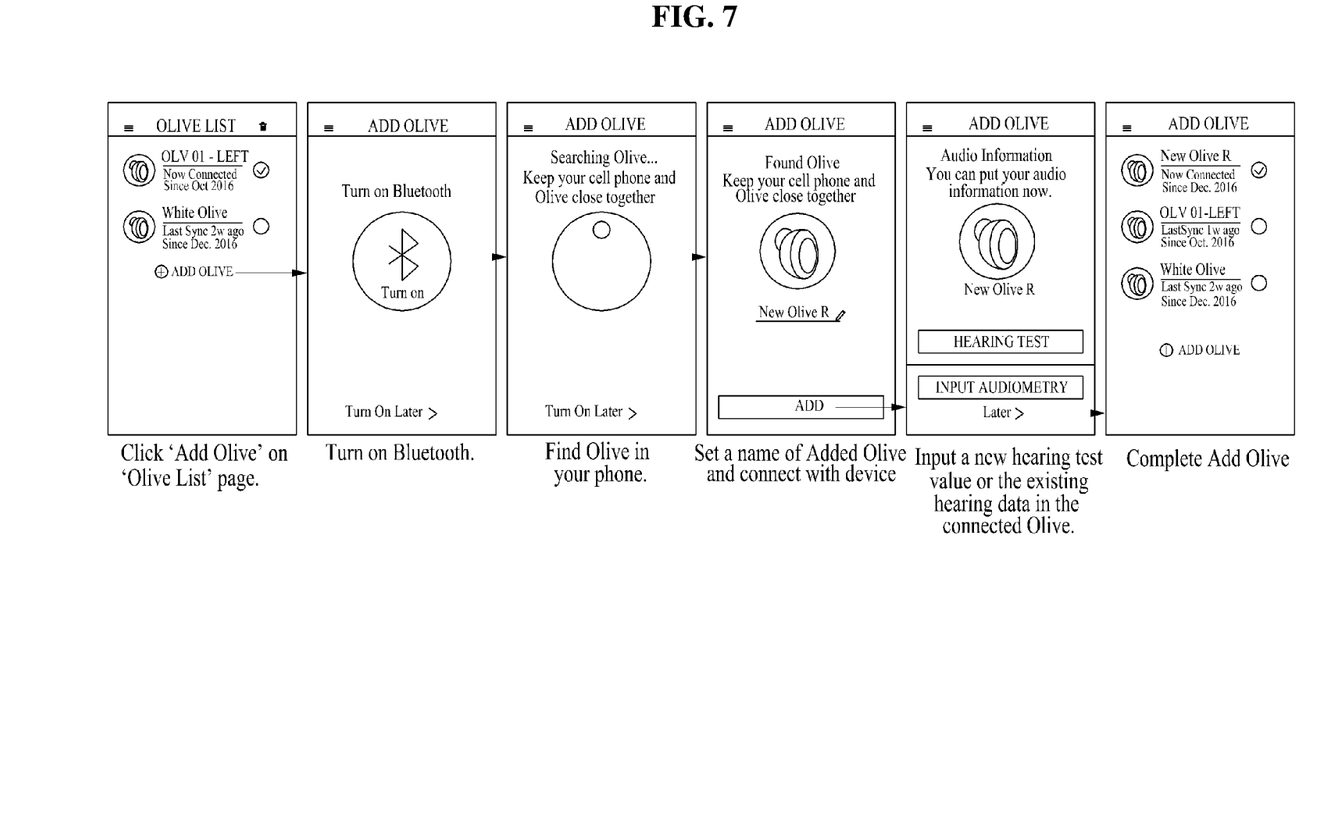
FIG. 7 represents a screen displayed on the terminal when a pairing unit connects the terminal and the device, according to an embodiment of the present invention.

FIG. 7 represents a screen displayed on the terminal when a pairing unit connects the terminal and the device, according to an embodiment of the present invention.

Referring to FIG. 7, Add Olive screen is displayed on the terminal 680 of a user. The Olive may be the left or right of the hearing aid that the user uses. Also, on the terminal 680 of the user, when click the Add Olive button in the Add Olive screen, a screen for connecting Bluetooth appears.

The process for connecting Bluetooth may be understood with the process in the pairing unit 632. Also, the Bluetooth searches Olive for connecting the Olive. The searched Olive may be connected with the terminal 680. Also, the connected Olive may be registered in the terminal 680.

The user may register a name for the Olive. Also, the existing test value or new test value may be input in the connected Olive.

Also, the terminal 680 displays Add New Olive screen when Add Olive is completed.

Figure 8:
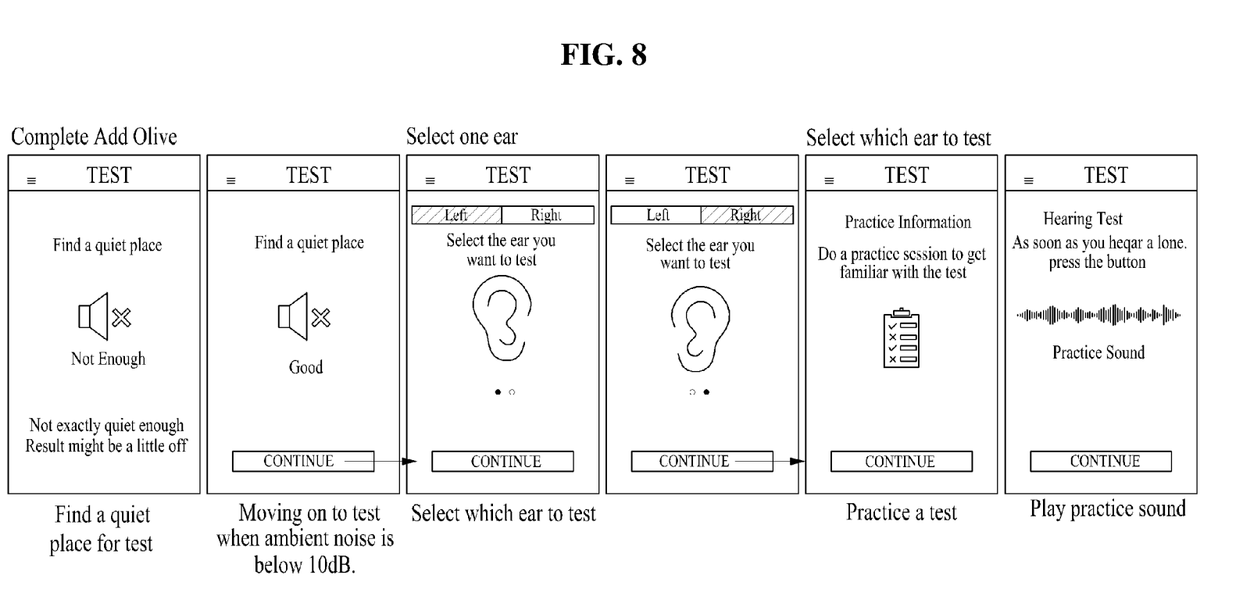
FIG. 8 represents a screen displayed on the terminal when a processing unit measures ambient noise, according to an embodiment of the present invention.

FIG. 8 represents a screen displayed on the terminal when a processing unit measures ambient noise, according to an embodiment of the present invention.

A test performed in the testing unit 633 may be performed when ambient noise is below a specific value, and the drawing illustrated in the left of FIG. 8 represents a notification to create an environment in which the noise may be reduced to a user. The process for creating the environment in which the noise is below a specific value may be performed in the performing unit 633-*e*.

The terminal 680 may display an authentication screen for satisfying the condition when the noise is below a specific value. Also, when the noise is below a specific value, the terminal 680 displays a selection screen for which one ear among two ears to be measured on the screen.

Also, the terminal 680 may perform a practice test when the series of process is completed. The practice test may test whether the surround of the testing unit 633 satisfies certain conditions before a real test is performed. In the right of FIG. 8, it is represented a screen displayed on the terminal 680 during the practice test is performed.

Figure 9:
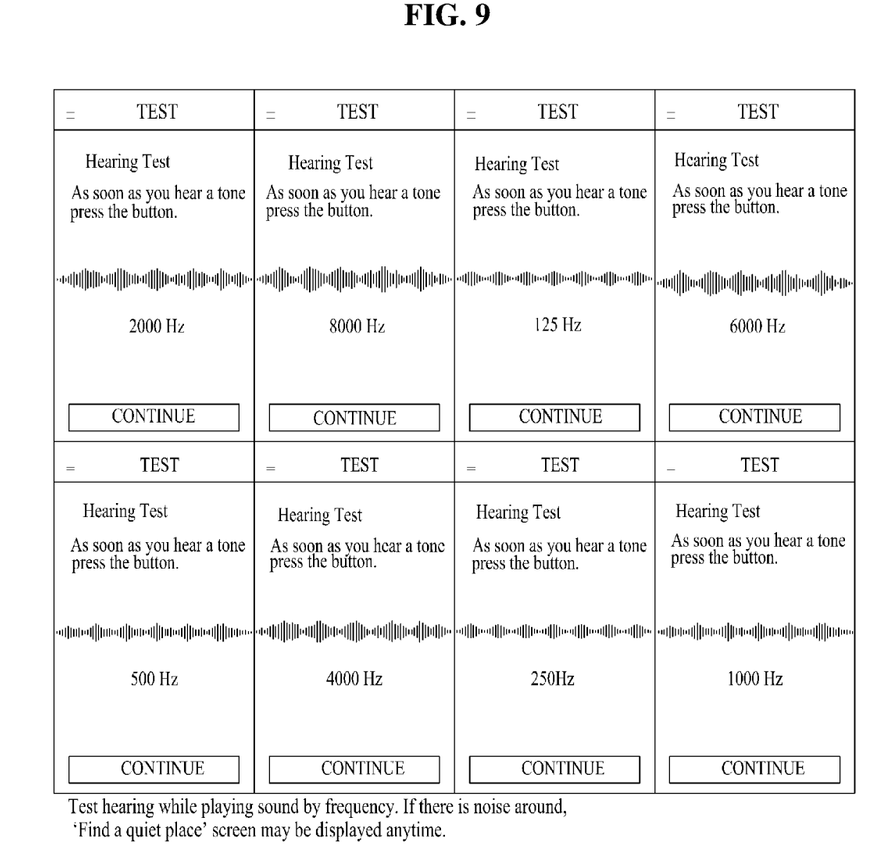
FIG. 9 represents a screen displayed on the terminal when a test unit tests hearing by frequency, according to an embodiment of the present invention.

FIG. 9 represents a screen displayed on the terminal when a test unit tests hearing by frequency, according to an embodiment of the present invention.

An audio signal recognized by each user may be tested in the testing unit 633 by measuring gain value by frequency. FIG. 9 represents a screen illustrated in the terminal 680 in a process for measuring gain value by frequency of the audio signal.

For example, the terminal 680 orders to click a button when the user's ear hears sound the best in case that 2000 Hz frequency is selected. This may correspond to other frequencies besides 2000 Hz, and the user may derive test result by putting together the information. FIG. 9 represents a screen illustrated in the terminal 680 of the user during processing the all process.

Figure 10:
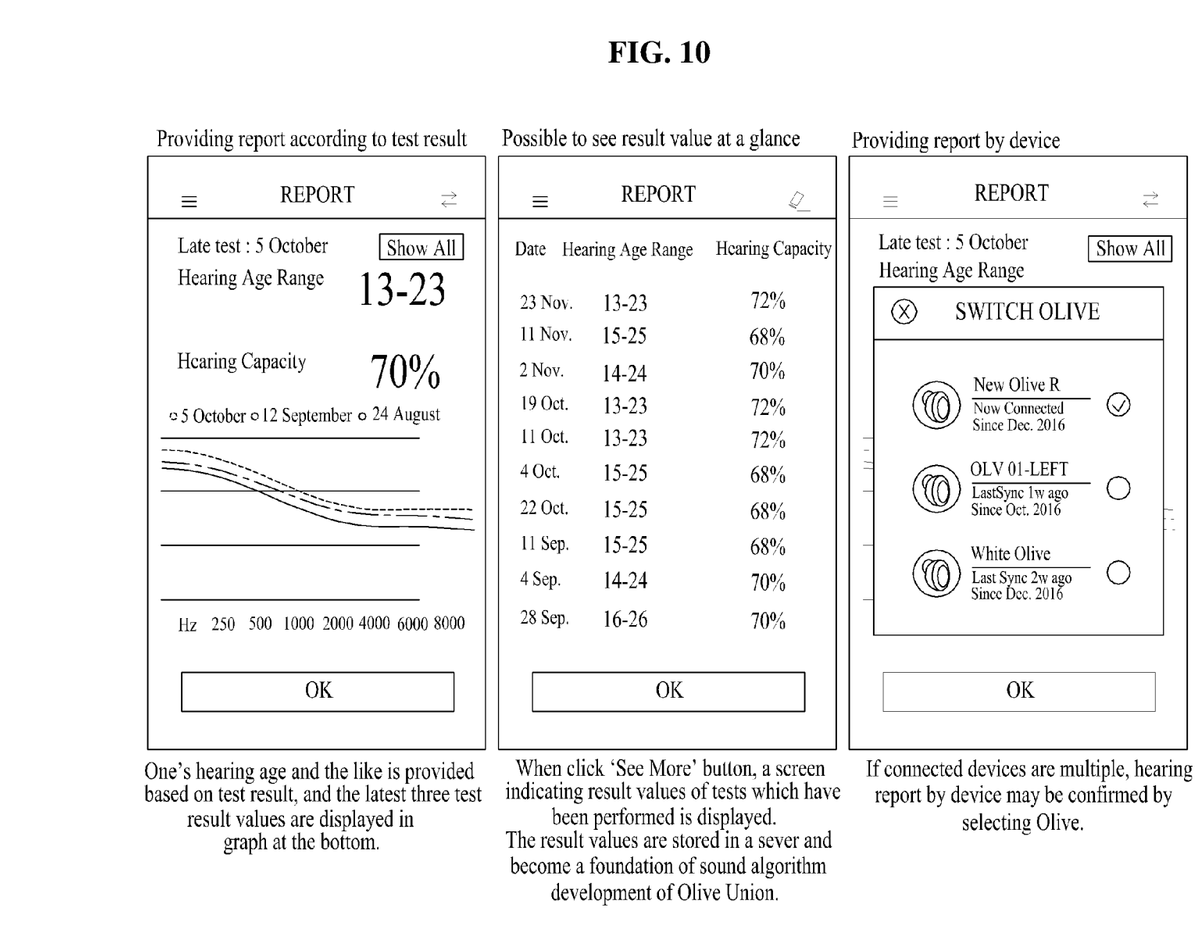
FIG. 10 represents a screen displayed on the terminal when a determining unit and a quantifying unit of a test unit are operated, according to an embodiment of the present invention.

FIG. 10 represents a screen displayed on the terminal when a determining unit and a quantifying unit of a test unit are operated, according to an embodiment of the present invention.

Referring to FIG. 10, the terminal 680 according to an example of embodiments quantifies age group and hearing of a user. The process for quantifying the age group and hearing of the user may be the process performed in the quantifying unit 633-*a* and the determining unit 633-*c*, A plurality of the quantified values may be displayed in a graph.

Also, the smart hearing device may store the existing tested audio signal by monthly, and an image for the terminal 680 displaying the monthly stored data is represented in the middle screen among the three screens illustrated in FIG. 10.

The process for storing monthly the audio signal may be performed through the storing unit 633-*i*.

Also, in the case that a plurality of devices are connected, the smart hearing device may select one among the devices, and displays a screen for confirming hearing report by devices on the terminal 680.

DESCRIPTION OF EMBODIMENTS FOR CARRYING OUT THE INVENTION

Although the embodiments of the present invention are described in detail above, claims of the present invention are not limited thereto, and various modifications and variations of those skilled in the art using the basic concept of the present invention defined in the following claims are included in claims of the present invention.

The invention claimed is:

1. A smart hearing method which uses an external processor in order to reduce cost of a hearing aid, said smart hearing method comprising:
    determining an operation mode of a hearing aid;
    transmitting a received audio signal to a terminal other than the hearing aid when it is determined that the operation mode of the hearing aid is a test mode among a normal mode or a test mode;
    receiving information related to a test result from a different terminal in response to processing the audio signal by the different terminal; and
    setting a control parameter for the hearing aid based on the information related to the test result,
    wherein the receiving includes
        activating a near field communication module of the hearing aid in response to processing the audio signal;
        pairing the hearing aid and the different terminal by using the near field communication module; and
        testing with test equipment located in the terminal, and
    wherein the testing includes
        receiving the audio signal and measuring gain by frequency of the audio signal,
        performing a practice test by playing a practice test sound before an actual test, and
        confirming whether various external conditions for the actual test are satisfied while playing the practice test sound.

2. The smart hearing method of claim 1, wherein the setting comprises:
    using a control value for each gain by frequency for the audio signal as the control parameter; and
    using a filter value for each gain by frequency for the audio signal as the control parameter.

3. The smart hearing method of claim 1, wherein the testing further comprises:
    quantifying hearing of a user according to the test result; and
    referring to and using the quantified hearing in a next test.

4. The smart hearing method of claim 1, wherein the testing further comprises:
    determining an age group of a user according to the test result; and
    referring to and using the determined age group in a next test.

5. The smart hearing method of claim 1, wherein the testing further comprises:
    performing the actual test if ambient noise is below a specific value; and
    setting the specific value below 10 dB.

6. The smart hearing method of claim 1, wherein the testing further comprises:
   storing a monthly record for the actual test; and
   selectively applying and using the stored monthly record.

7. A smart hearing device which uses an external processor in order to reduce cost of a hearing aid, said smart hearing device comprising:
   a determining unit for determining an operation mode of a hearing aid;
   a transmitting unit for transmitting a received audio signal to a terminal other than the hearing aid when it is determined that the operation mode of the hearing aid is a test mode among a normal mode or the test mode;
   a receiving unit for receiving information related to a test result from a different terminal in response to processing the audio signal by the different terminal; and
   a setting unit for setting a control parameter for the hearing aid based on the information related to the test result,
   wherein the receiving unit includes
      an activating unit for activating a near field communication module of hearing aid in response to processing the audio signal;
      a pairing unit for pairing the hearing aid and the different terminal by using the near field communication module; and
      a testing unit for testing with test equipment located in the terminal, and
   wherein the testing unit includes
      a measuring unit for receiving the audio signal and measuring gain by frequency for the audio signal,
      a practice testing unit for performing a practice test by playing a practice test sound before an actual test; and
      a confirming unit for confirming whether various external conditions for the actual test are satisfied while playing the practice test sound.

8. The smart hearing device of claim 7, wherein the setting unit comprises:
   a control value using unit for using a control value for each gain by frequency for the audio signal as the control parameter; and
   a filter value using unit for using a filter value for each gain for frequency for the audio signal as the control parameter.

9. The smart hearing device of claim 7, wherein the testing unit further includes:
   a quantifying unit for quantifying hearing of a user according to the test result; and
   a using unit for referring to and using the quantified hearing in a next test.

10. The smart hearing device of claim 7, wherein the testing unit further includes:
    a determining unit for determining an age group of a user according to the test result; and
    an age group using unit for referring to and using the determined age group in a next test.

11. The smart hearing device of claim 7, wherein the testing unit further includes:
    a performing unit for performing the actual test when ambient noise is below a specific value; and
    a specific value setting unit for setting the specific value below 10 dB.

12. The smart hearing device of claim 7, wherein the testing unit further includes:
    a storing unit for storing a monthly record for the actual test; and
    a monthly record using unit for selectively applying and using the stored monthly record.

* * * * *